Nov. 11, 1952 — W. C. MOELLER — 2,617,100
OPTICAL EYE SHIELD
Filed Aug. 1, 1949
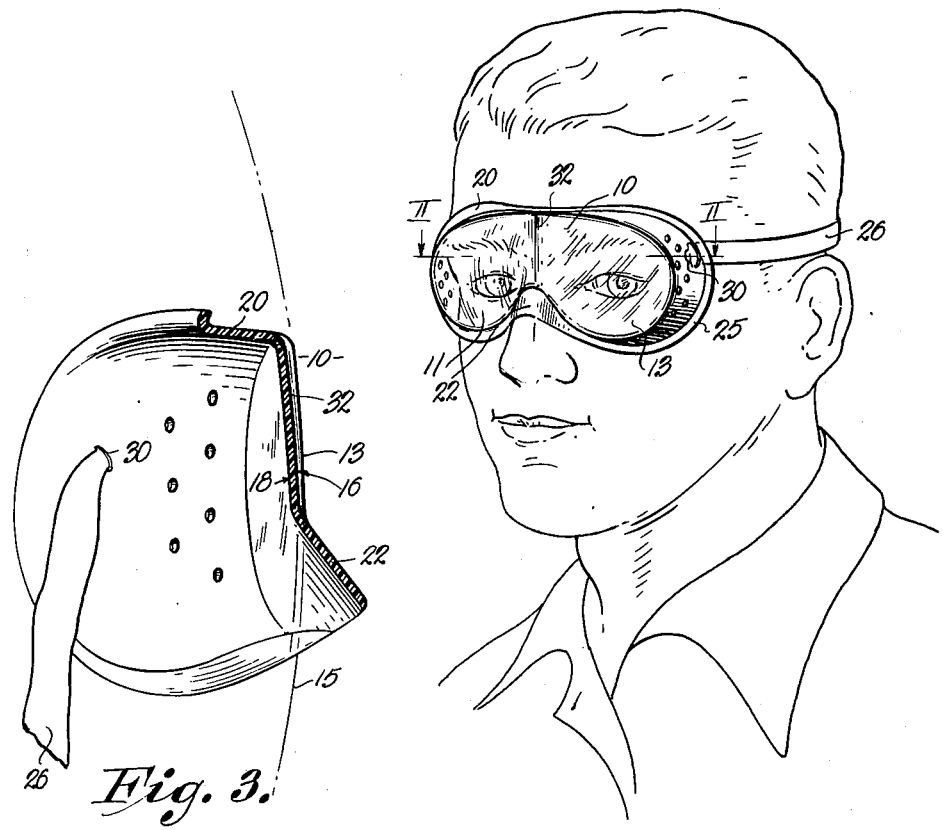
Fig. 3.
Fig. 1.
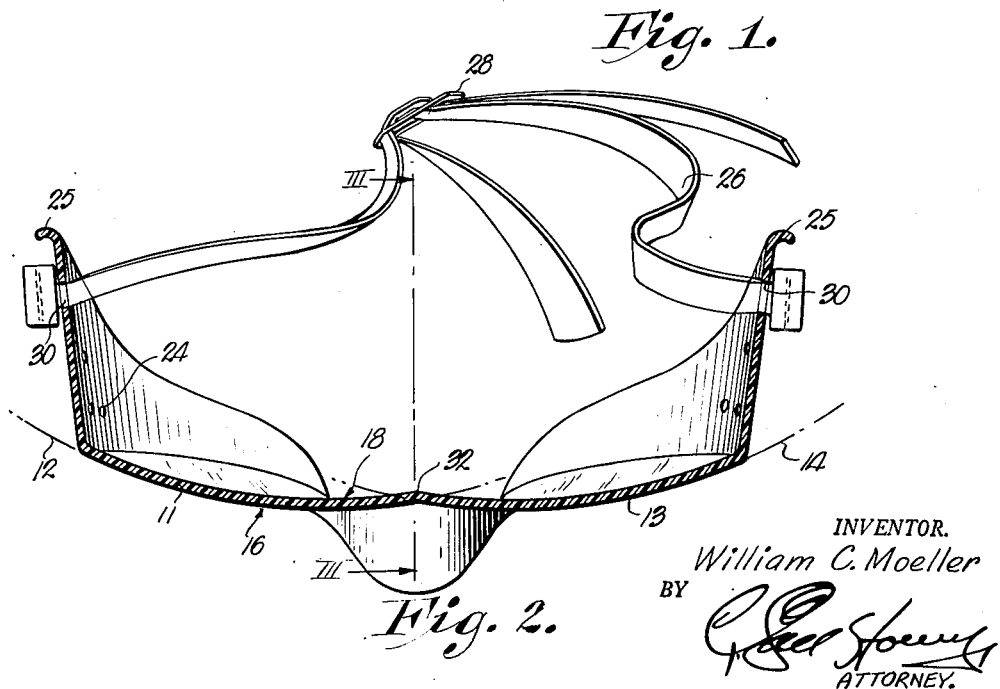
Fig. 2.
INVENTOR.
William C. Moeller
BY
ATTORNEY.

Patented Nov. 11, 1952

2,617,100

UNITED STATES PATENT OFFICE 2,617,100

OPTICAL EYE SHIELD

William C. Moeller, Kansas City, Mo., assignor, by mesne assignments, to Parmelee Plastics Company, Kansas City, Mo., a corporation of Missouri Application August 1, 1949, Serial No. 107,968

2 Claims. (Cl. 2—14)

This invention relates to safety appliances in the nature of eye shields commonly called "goggles," the function whereof is to protect the eyes of the wearer both with regard to clearness of vision and obstructing the passage of foreign particles thereto.

The primary aim of the instant invention is the provision of goggles of the aforementioned character having as a part thereof, an eye protecting wall the form whereof is specially created to prevent distortion and to afford clear vision.

Another aim of this invention is to provide an eye shield in the form of conventional goggles, having a transparent wall, the form of which is a pair of complete segment of a sphere to present both a longitudinally and transversely arched panel before each eye of the wearer, that will assure clear, unobstructed vision and thereby permit precision work and the handling of tools without danger of misjudgment.

A further aim of this invention is to provide goggles of the aforementioned character, the specially contoured, transparent wall of which is held in operative position by an integral, circumscribing flange, contoured to fit the face of the wearer and to hold the wall a desired, predetermined distance in front of the eyes to assure proper related function between the eyes and said goggle wall.

Other objects of the invention will appear during the course of the following specification, referring to the accompanying drawing, wherein:

Fig. 1 is a perspective view of optical goggles made to embody the present invention.

Fig. 2 is a longitudinal, substantially central sectional view through the goggles, taken on line II—II of Fig. 1; and Fig. 3 is a vertical central cross sectional view taken on line III—III of Fig. 2.

Eye protecting devices in the nature of goggles have heretofore been manufactured and used without special regard to their optical properties, unless the wearer provided corrective lenses on the front wall of the goggles to insure vision where he could not otherwise see.

Where goggles are to be worn by those of normal eye sight, not needing correction, the transparent walls will often times establish a distortion detrimental to the wearer and responsible for accidents or poor work due to distorted vision. The problem presented, therefore, is that of supplying optically correct, inexpensive, comfortable goggles, capable of affording vision of the same accuracy that would be experienced if the goggles were not worn. Accordingly, the goggles embodying this invention comprise a transparent wall 10, specially formed in that the entire wall is in the form of a pair of segments of a sphere presenting two lens sections 11 and 13. In other words, each section 11 and 13 is both longitudinally and transversely arched. Intersecting lines 12 and 14 in Fig. 2 indicate the longitudinal arching of sections 11 and 13 respectively, and line 15 in Fig. 3 shows the transverse arching of the sections.

It has been found in actual practice and during the construction of these optically correct goggles, that it is important that the wall 10 be uniform in thickness throughout its area and that the front surface 16 and the rear surface 18 be in parallelism. Thus no magnification, prismatic effect or distortion will be experienced by the wearer.

Wall 10 is circumscribed by a flange 20 contoured near the transverse medial line of wall 10 to present a nose receiving embossment 22. This embossment 22 extends inwardly from the lower longitudinal edge of wall 10 and interrupts its area at that point. The wall 10 is, therefore, formed as illustrated in Fig. 1 but the line of vision is not obstructed for the length of wall 10 is such as to reach beyond the sides of the eyes of the wearer where any normal line of vision would be intersected thereby.

Flange 20 is continuous and is provided with vent openings 24. The upper edge of flange 20 is outwardly arched as at 25 and contoured to snugly fit the face around the eyes and over the bridge of the nose.

Means for removably attaching the goggles is provided in the nature of a resilient strap 26, having an adjusting buckle 28 of conventional character. This strap 26 has its ends knotted or otherwise enlarged so as to preclude withdrawal from holes 30 formed in flange 20 for the purpose of receiving the ends of straps 26.

It is noted that each lens portion 11 and 13 is contoured to present a segment of a true sphere. Thus each eye of the wearer is provided with a correctly arched surface within its line of vision. One side of each lens portion 11 and 13 is defined by a relatively straight line 32 adjacent the nose embossment 22.

In the manufacture of the goggles above described, it is important that the dies used to form the unitary body of plastic substance, be made to form front wall 10, after which the flange 20 and embossment 22 are created. Conventional pressure rings in the forming dies are used to hold front wall 10 in a set position while the remaining part of the unitary body is struck from a normally flat piece of transparent material. So forming the goggles will present a light, effective and optically correct device, comfortable to wear and capable of affording accurate vision.

Having thus described the invention, what is claimed as new and desired to be secured by Letters Patent is:

1. In goggles of the kind described, an elongated, transparent wall having a nose-receiving embossment and a pair of concavo-convex lens sections, each defining a segment of a true, hollow sphere; and a peripheral, laterally extending, face-engaging flange on the wall, there being a central portion forming a part of said wall, integrally joining the lens sections, and having a median straight line extending transversely across said wall from said embossment.

2. In goggles of the kind described, an elongated, transparent wall having a nose-receiving embossment and a pair of concavo-convex lens sections, each defining a segment of a true, hollow sphere; and a peripheral, laterally extending, face-engaging flange on the wall, there being a central portion forming a part of said wall, integrally joining the lens sections, and having a median straight line extending transversely across said wall from said embossment, said lens sections having intersecting lines of curvature on said straight line intermediate the ends of the latter.

WILLIAM C. MOELLER.

REFERENCES CITED

The following references are of record in the file of this patent:

UNITED STATES PATENTS

| Number | Name | Date |
|---|---|---|
| 583,590 | Bennett | June 1, 1897 |
| 1,947,137 | Fraser | Feb. 13, 1934 |
| 2,274,791 | Huggins | Mar. 3, 1942 |
| 2,393,533 | Heinz | Jan. 22, 1946 |

FOREIGN PATENTS

| Number | Country | Date |
|---|---|---|
| 353,761 | Italy | Oct. 29, 1937 |